(12) United States Patent
Jacoby et al.

(10) Patent No.: US 8,381,240 B2
(45) Date of Patent: Feb. 19, 2013

(54) FRAMEWORK FOR PROVIDING DIGITAL HOME SERVICES

(76) Inventors: Ronald Jacoby, Saratoga, CA (US); Michael Mills, Redwood City, CA (US)

( * ) Notice: Subject to any disclaimer, the term of this patent is extended or adjusted under 35 U.S.C. 154(b) by 1367 days.

(21) Appl. No.: 11/261,436

(22) Filed: Oct. 27, 2005

(65) Prior Publication Data

US 2007/0101368 A1    May 3, 2007

(51) Int. Cl.
*H04N 7/16* (2011.01)
(52) U.S. Cl. .................................................. 725/14
(58) Field of Classification Search ............ 725/10, 725/14, 19, 109
See application file for complete search history.

(56) References Cited

U.S. PATENT DOCUMENTS

| | | | |
|---|---|---|---|
| 5,945,988 A * | 8/1999 | Williams et al. | 715/747 |
| 2002/0112239 A1* | 8/2002 | Goldman | 725/46 |
| 2004/0031058 A1* | 2/2004 | Reisman | 725/112 |
| 2004/0268403 A1* | 12/2004 | Krieger et al. | 725/112 |
| 2006/0026279 A1* | 2/2006 | Zigmond et al. | 709/224 |
| 2006/0179410 A1* | 8/2006 | Deeds | 715/750 |
| 2007/0169148 A1* | 7/2007 | Oddo et al. | 725/46 |

\* cited by examiner

*Primary Examiner* — Vivek Srivastava
*Assistant Examiner* — Ricky Chin

(57) ABSTRACT

The systems and methods of the present invention provide for a number of improvements to the TV consumption process, including personalization, community viewing, shared presence and context, messaging, access to ratings and recommendations (including community reviews), alerts, etc. One method that the present invention provides allows for the indication of a given user's context to be provided to other users, such as users in the given user's social network. The method comprises generating an indication of a change in context for a given user, the context comprising information regarding an action of the given user. The indication of the change in context for the given user is propagated to one or more users in the social network for the given user. The indication of the change in context of the given user is presented to users in the given user's social network in conjunction with TV content.

54 Claims, 5 Drawing Sheets

FRAMEWORK FOR PROVIDING DIGITAL HOME SERVICES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

The present invention generally provides methods and systems for facilitating messaging and messaging related services in a television environment. More specifically, the present invention provides methods and systems that facilitate the interaction between messaging and television platforms to allow for interaction between users in a television environment.

Systems for distributing TV content are generally well known to those of skill in the art. Over the past several decades, the number of systems designed for the distribution and consumption of TV content has proliferated, while the number of available channels of TV content has skyrocketed. For example, viewers are now able to consume TV content over cable, over the air broadcast, satellite, fiber optic, as well as other point (and multipoint) to multipoint distribution systems, each potentially offering several hundred channels of scheduled and on-demand TV content. Consumers have had difficulty in effectively utilizing the pool of available TV content due to a lack of useful tools for analyzing programming to determine the TV content that is potentially the most enjoyable to the user. Furthermore, the viewing of TV content has heretofore been an essentially solitary experience outside of viewing TV content with another individual located at the same location.

Messaging services, as well as platforms for providing the same, are also well know to those of skill in the art. A messaging platform provides a foundation for shared communications between users and allows a user to identify one or more"buddies", which are users of the messaging platform who are in a given user's social network. For example, two users using a messaging client, each in communication with a messaging server, may exchange instant message communications between their respective clients. Using messenger clients and servers, users may also engage in a shared web browsing experience, as well as sharing other applications. Unfortunately, there are no techniques for implementing the shared experience and interactivity with other users of a messaging platform when viewing TV content.

In order to overcome these shortcomings and other problems associated with existing apparatuses and techniques for viewing TV content and interacting with messaging platforms, embodiments of the present invention provide systems and methods for both a shared viewing experience of TV content, as well as providing messenger and messenger related services and content within the framework of viewing TV content, in addition to other improvements to the art.

SUMMARY OF THE INVENTION

The present invention provides systems and method that allow for a number of improvements to the TV consumption process, including personalization, community viewing, shared presence and context, messaging, access to ratings and recommendations (including community reviews), alerts, etc.

One embodiment of a method according to the present invention for providing an indication of an action of a given user consuming content on a client device transmitted from a TV content distribution system comprises generating an indication of a change in context for a given user (the context comprising information regarding an action of the given user) and propagating the indication of the change in context for the given user to one or more users in the social network for the given user. The indication of the change in context for the given user is presented to users in the given user's social network in conjunction with TV content. Propagating may comprise propagating the indication to other users in the given user's social network with a direct relationship with the given user, as well as identifying one or more other users in a social network of the given user, the one or more other users consuming TV content on client devices in communication with one or more TV content distribution systems. User context, as well as indications regarding the same, is described in greater detail herein.

Presenting an indication of the change in context may be accomplished according to a number of techniques. According to one embodiment, presenting the indication of the change in context comprises presenting an icon representing the changed context. Difference icons may be presented on the basis of the type of context change being propagated. For example, presenting may comprise presenting an icon representing a television program, presenting an icon representing a movie, presenting an icon representing an on-line game, presenting an icon representing music, etc. Similarly the system may generate an indication of a context change in response to a number of different types of context changes. For example, generating an indication may comprise generating in response to a change in channel, generating in response to joining an on-line game, generating in response to viewing a movie, generating in response to listening to music, etc. As discussed herein, the present invention provides for instant messaging features in a TV consumption environment. Accordingly, propagating an indication of a context change may be accomplished by propagating to users on a given user's buddy list maintained by an instant messenger client on the given user's client device.

According to another embodiment, the present invention provides a method for providing an indication of an action of a given user consuming content on a client device transmitted from a TV content distribution system that comprises receiving an indication of a change in context for a given user (the context comprising information regarding an action of the given user) and propagating the indication of the change in context for the given user to one or more users in the social network for the given user.

Propagating may comprise propagating to users on a given user's buddy list maintained by an instant messenger client on the given user's client device, and the indication of the change in context may comprise propagating an icon representing the changed context. A system operating according to the present method may propagate different icons that indicate different types of content changes including, but not limited to, an icon representing a television program, an icon representing a movie, an icon representing an on-line game, an icon representing music, etc. In addition to icons, those of skill in the art recognize that other indications may be utilized, such as, text, images, video, audio, avatars, etc. Similarly, a client device may receive the indication of the change in context in response to different types of context changes including, but not limited to, receiving in response to a change in channel, receiving in response to watching a movie, receiving in response to joining an on-line game, receiving in response to listening to music, etc. When propagating the indication of the context change, the propagation may be limited to users within the given user's social network that maintain a direct relationship with the given user.

According to another embodiment, the present invention provides a method for providing an indication of an action of a given user consuming content on a client device transmitted from a TV content distribution system that comprises generating an indication of a change in context for a given user (the context comprising information regarding an action of the given user) and receiving an indication of a change in context from one or more users in the given user's social network. The method may be limited to receiving context change indications from other users in the given users' social network with a direct relationship with the given user. One or more other users in a social network of the given user may also be identified, the one or more other users consuming TV content on client devices in communication with one or more TV content distribution systems.

Receiving the indication of the change in context may comprise receiving an icon representing the changed context. The method may also comprise receiving the indication of the context change, or information regarding the context change itself, in response to a number of different changes in context. For example, receiving may comprise receiving an icon representing a television program, receiving an icon representing a movie, receiving an icon representing an on-line game, receiving an icon representing music, etc. Similarly, the context change may be generated in response to a number of disparate changes in context, e.g., in response to joining an on-line game, in response to listening to music, in response to viewing a movie, etc. Users may receive context changes from users on a given user's buddy list maintained by an instant messenger client on the given user's client device.

The present invention also directed towards a system for providing an indication of an action of a given user consuming content on a client device transmitted from a TV content distribution system. According to one embodiment the system comprises a TV application component that is operative to receive a command indicating a context change from a given user and to transmit content that is responsive to the changed context to a client device of the given user. A messenger component is operative to receive the changed context for the given user from the TV application component, identify one or more users in the given user's social network and propagate an indication of the changed context to the one or more users in the given user's social network.

The system contemplates a number of disparate client devices that may attached to the system. When consuming TV content in a traditional television environment, the client device may comprise a set top box. Use of the system, however, is not limited to use consuming TV content in a traditional television environment and may be utilized by mobile devices, including cellular handsets and personal digital assistants, as well as personal computers. These client devices may execute client side application component whereby the messaging component is in communication with one or more messaging clients to which the messaging component propagates an indication of the changed context.

The system may also comprise a profile component operative to receive the changed context form the messaging component and record the context change for the given user in a user profile. The profile component may access a profile data store operative to maintain one or more user profiles. The profile component may record a plurality of context changes for a given user to a user profile for the given user, thereby maintaining a historical record of a given user's context changes over a period of time.

A recommendation component may also be provided that is operative to read the context changes from the user profile for the given user and generate a recommendation on the basis of the context changes. According to embodiments of the invention, the recommendation component may recommend a movie, a television program, an on-line game, music or other audio content, etc. Additionally, the recommendation component is operative to read context changes from a plurality of user profiles and generate a recommendation on the basis of the plurality of context changes, such as according to a community of users or where users are related in a social network.

In addition to the foregoing, one or more other applications are operative to interface with the TV application component for transmission of content from a given one of the one or more other applications. For example, an on-line game application may interface with the TV application component to transmit the on-line game content to a given user. Similarly, audio playback applications and transmission applications may interface with the TV application component for transmission of audio content to users. Other applications for providing a variety of content are known to those of skill in the art.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE INVENTION

In the following description of embodiments of the invention, reference is made to the accompanying drawings that form a part hereof and in which is shown by way of illustration a number of specific embodiments in which the invention may be practiced. It is to be understood that other embodiments may be utilized and structural changes may be made without departing from the scope of the present invention.

Figure 1:
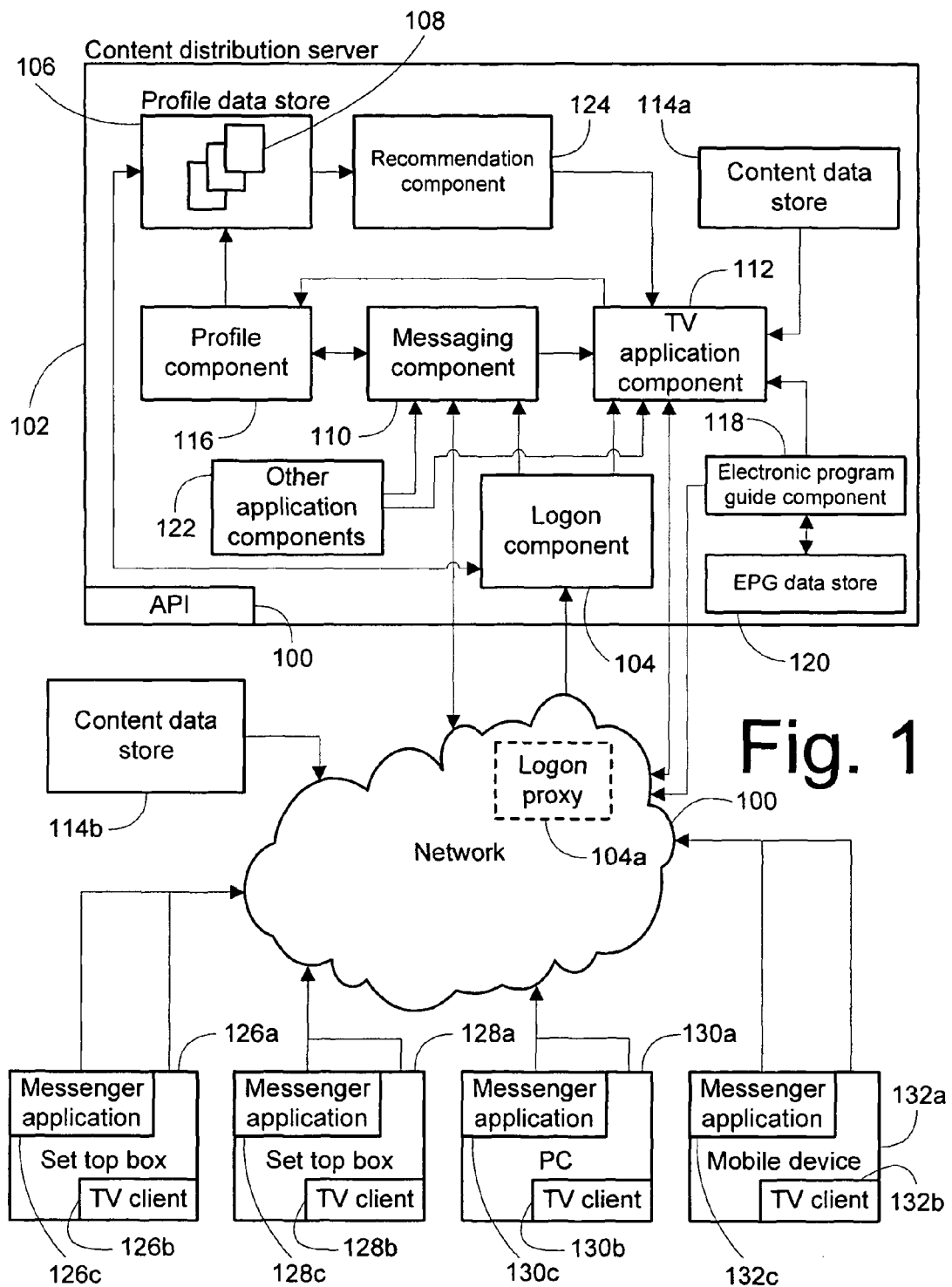
FIG. 1 is a block diagram illustrating a system for providing access to messenger services and content in conjunction with TV content and ancillary TV content according to one embodiment of the present invention.

FIG. 1 presents a block diagram illustrating one embodiment of a system for providing access to messaging services and content in conjunction with television and TV related content. According to the embodiment of FIG. 1, a content distribution server 102 comprises one or more software and hardware components to facilitate the delivery of television and TV related content in conjunction with messaging and messaging related content and services. Hardware and software components include, but are not limited to, a logon component 104, a messaging component 110, a TV application component 112, a profile component 116, an electronic program guide component 118, a recommendation component 124 and other applications 122. The content distribution server 102 also comprises one or more data stores for persistent storage of information used in providing both TV and messaging content and services including, but not limited to, a profile data store 106, content data stores 114a and 114b, and an EPG data store 120.

The content distribution server 102 is communicatively coupled with a network 100, which may include a connection to one or more local and/or wide area networks, such as the Internet. Using the network 100, the content distribution server 102 is capable of accessing local 114a and remote 114b television content, as well as providing television and messaging services, including combinations thereof, to clients 126a, 128a, 130a and 132a. The content distribution server 102 is operative to provide TV and messaging content and services to any client device capable of running TV client software 126b, 128b, 130b and 132b, as well as a messaging client 126c, 128c, 130c and 132c. For example client devices may include set top terminals 126a and 128a that use a television as a display device, computer hardware such as a personal computer 130a and mobile devices 132a, such as cellular handsets and personal digital assistants ("PDA"). Other types of electronic communications equipment is contemplated as falling with in the scope of the invention including, but not limited to, digital media adapters, DVD players, connected TVs and other networked consumer electronic devices.

When a given client 126a, 128a, 130a and 132a initially accesses the content and services that the content distribution server 102 provides, the server authenticates the given user and/or client device. The content distribution server 102 provides a logon component that allows for the authentication of clients 126a, 128a, 130a and 132a and/or users of a given client device. A client deice 126a, 128a, 130a and 132a initializes its TV client application 126b, 128b, 130b and 132b and messenger client application 126c, 128c, 130c and 132c, which initiates the generation and transmission over the network 100 of a logon request to the logon component 104. According to one embodiment of the invention, the logon request comprises information identifying the user of the client device in addition to information regarding the client device itself, e.g., a MAC address, IP address, phone number or other uniquely identifying descriptor. By providing information regarding the user, the content distribution server 102 may provide a personalized experience to the user regardless of the specific client device 126a, 128a, 130a and 132a with which the user connects to the content distribution center 102.

The logon component 104 receives the logon request from a given client 126a, 128a, 130a and 132a and attempts to authenticate the user and/or device. The logon component 104 may access a profile 108 for the given user that a profile data store 106 maintains. Accordingly, the logon component 104 uses information identifying the user in an attempt to authenticate the identity of the user, e.g., against information contained in the user's profile 108. The identifying information may comprise a username and password whereby the logon component 104 conducts a comparison to ensure that the received password is identical to a stored password. Alternatively, or in conjunction, the logon component 104 may conduct an exchange of public keys with the client 126a, 128a, 130a and 132a whereby each device (client and logon component) encodes outgoing data with the received public key and decodes received data with its private key. The logon component 104 may also receive information regarding the client device 126a, 128a, 130a and 132a, e.g., a MAC address or other uniquely identifying indicia, to authenticate the client device or otherwise validate that the client 126a, 128a, 130a and 132a may connect to the content distribution server 102.

The content distribution server 102 may also implement a logon proxy 104a to provide scalability and the flexibility to handle large numbers of clients 126a, 128a, 130a and 132a attempting to connect to the logon component 104. Multiple client devices 126a, 128a, 130a and 132a initiate communication over the network 100 with a given one of one or more logon proxies 104a. Each logon proxy 104a initiates communication with the logon component 104, thereby allowing the logon component 104 to service a large number of client requests without the necessity of maintaining and managing a connection with each requesting client 126a, 128a, 130a and 132a.

Where the logon component 104 is unable to successfully authenticate the user or client 126a, 128a, 130a and 132a, the logon component 104 prevents the client 126a, 128a, 130a and 132a from accessing functionality that the content distribution server 102 offers. Alternatively, the logon component 104 may solely provide access to the TV application component 112, electronic program guide component 118 and EPG data store 120, thereby allowing the user to view TV content and scheduling data on the client 126a, 128a, 130a and 132a. A user whom the logon component is unable to authenticate is therefore presented with a traditional digital TV content viewing experience with content from one or more content sources 114a and 114b, as well as program guide data for his or her locality.

Where the logon component 104 successfully authenticates the user and/or client device, the logon component may record an indication of the successful authentication in the user's profile 108 in the profile data store 106. The logon component 104 provides an indication to the messaging server 110 and the TV application component 112 that the user and/or client 126a, 128a, 130a and 132a has been successfully authenticated and may be provided with access to the content distribution server and its constituent components identified above. Upon successful authentication, the messaging server 110 passes the identity of the user to the profile component 116, which retrieves the user's profile 108 from the profile data 106 store for transmission to the messaging component 110. The messaging component 110 may also provide the TV application 112 with a copy of the user's profile 108, or the TV application component 112 may obtain a copy of the user's profile 108 directly from the profile component 116.

The content distribution server 102 maintains a user profile 108 for each user in a profile data store 106, which is managed by a profile component 116. As indicate above, a user profile 108 maintains authentication information for the user, such as a username and password. The user profile may also be used by the messaging component 110 and TV application component 112 for the recordation of user interaction with the components, 110 and 112, respectively. Accordingly, the user profile may maintain an historical record of the interactions of the user with the content distribution server 102. Those of skill in the art should understand, however, that a subset of this historical interaction may be written to the user profile 108. For example, when the user is using the TV application component 112 to view TV content, the TV application component 112 sends a message to the profile component 116 to write indicia to the user's profile 108 in response to the receipt of a command, e.g., a change channel command. Similarly, when the messaging component 110 provides messaging content and related services to the user, the messaging component 110 sends a message to the profile component 116 instructing it to write indicia to the user's profile 108 in response to the receipt of a command, e.g., sending a message to another user or stepping into an on-line game.

The profile 108 also maintains a user's "context". According to one embodiment, a user's context may be a notion of an action that a given user is performing at a given point in time, which may also include the location from which the user is performing that action. Put another way, a user's context may be what the user is doing at a given point in time, e.g., watching a given TV channel, playing an on-line game, listening to music, conducting an on-line transaction, etc. The context may also indicate from where or what type of device the client is connecting to the content distribution server 102, e.g., a set top box 126a and 128a, a personal computer 130a, a mobile device 132a, etc. By providing the user's context to the messaging component 110 and the TV application component 112, each component, 110 and 112, is capable of identifying and retrieving the proper content to provide the user with messaging content and related services unified with TV content and related services as is explained in greater detail herein. The profile component 116 receives updates to the given user's context form the messaging component 110 and TV application component 112 that the profile component 116 writes to the user profile 108 for the given user. The profile 108 for a given user therefore maintains an historical record of the user's context over a period of time.

The profile may also maintain information regarding other users of the system to whom a given user is related. For example, the given user may use a messaging client 126c, 128c, 130c and 132c on a client device 126a, 128a, 130a and 130a to identify one or more buddies, the identities of which are written to the given user's profile 108. By traversing groups of related users, the profile component 116 is operative to identify social networks of users. Communities of users may also exist whereby an indication of the membership in a community is written to the given user's profile 108. Similarly, the profile component 116 may identify subsets of a given user's buddies from the given user's total set of buddies. According to one embodiment, the profile component 116 calculates a social network for a given user that comprises all users with an N-degree relationship to the given user. For example, User A maintains a direct relationship with User B, and User B maintains a direct relationship to user C. User A and User C are related by two degrees, whereas each is related to User B by one degree.

The TV application component 112 identifies the user's context and retrieves the proper TV content for transmission over the network 100 to the client device 126a, 128a, 130a and 132a with which the user is interacting. Furthermore, the TV application component 112 may retrieve ancillary TV content including, but not limited to, audio, video, text, images and combinations thereof. According to one embodiment of the invention, the TV application component 112 retrieves TV content and ancillary TV content from a local content data store 114a, which may aggregate TV content and ancillary TV content from a variety of disparate sources. Alternatively, or in conjunction, the TV application component 112 receives TV content and ancillary TV content from a local content data store 114a, as well as over the network 100 from a remote content data store 114b, where required content resides remotely from the server 102. Similarly, the TV application component 112 may collect TV content from a plurality of TV content distribution systems (not pictured) for storage in the local and remote content data stores, 114a and 114b, respectively. The TV application component 112 may selectively transmit TV content to users on the basis of a schedule for the transmission of TV content promulgated by the TV content distribution system for the region in which a given user is located.

The messaging component 110 is also provided with the user's context, thereby allowing the messaging component 110 to know what actions the user is performing, e.g., watching TV content, viewing ancillary TV content, playing an on-line game, listening to music, etc. Because the messaging component 110 is aware of the user's identity, the messaging component 110 may identify other users in the given user's social network, also referred to as the user's "buddies". With knowledge of the given user's identity and other users in the given user's social network, the messaging component 110 may instruct the TV application 112 to propagate the given user's context to other users in the given user's social network. Propagating the user's context may include generating an image representing the user's context, which may further include other data describing the user's context (e.g., text, audio, video, combinations thereof, etc.). Alternatively, information regarding the user's context may be used to lookup and retrieve additional related information from a content data store 114a and 114b. The TV application server 112 presents other users in the given user's social network with the given user's context, such as through the presentation of an icon. The TV application server 112 may provide a given user with the context of other users in the given user's social network, and vice versa.

The following example may be illustrative and is not intended to be limiting. Assume that the user is watching the TV program "The Apprentice" on channel three. According to one embodiment, the messaging component 110 identifies the user's buddies and instructs the TV application component 112 to propagate the user's context to his or her buddies. The TV application component 112 generates a thumbnail image representing the program "The Apprentice", which the TV application component 112 propagates to the given user's buddies. The thumbnail is presented on a client device for a given buddy with information describing the program, e.g., the tile and the fact that the user is watching the program on channel three. The TV application server 112 may modify information regarding the given user's content, e.g., scaling down the thumbnail image, on the basis of a given destination client device 126a, 128a, 130a and 132a.

The messenger component 110 and TV application component 112 allow for a number of advanced features not available in content distribution systems known to those of skill in the art. Because the messaging component is aware of a given user's context and may receive input from a given client device 126a, 128a, 130a and 132a, users of the content distribution server 102 may interact with one another. The messaging component 110 provides a given user's context to the TV application component 112, which propagates the context to other users in the given user's social network and vice versa. The given user may select an indication of the context of other users in the given user's social network to initiate an action. Initiating an action may include starting an instant message conversation with the selected user, switching context to the context of the selected user, etc. Selections are passed to the messaging component 110, which performs the requested action and provides content for the TV application component to consume and propagate as is appropriate to other users. One illustrative use of this functionality is shared viewing of content between a plurality of users, shared remote control functionality between a plurality of users, combinations thereof, shared remote and shared viewing with instant messaging between a plurality of users, etc.

The messaging component 110 also provides access to other application components 122. Alternatively, other application components 122 may communicate directly with the TV application component 112 to provide content for distribution to one or more client devices 126*a*, 128*a*, 130*a* and 132 *a* in communication with the content distribution server 102 over the network 100. One exemplary other application component 122 is an on-line poker playing application. The other application 122 handles the main program logic for on-line poker playing game. Each user's context (which may comprise location information (e.g., playing on-line poker), the identities of other players in the game, what the given user's action is (call, raise, fold), etc.) is provided to the messaging component 110, which passes information regarding a given user's context to the TV application component for propagation to other players in the game.

Propagation of information regarding a given user's context may also be propagated to other users in a given user's social network who are not necessarily playing the on-line poker game. Those of skill in the art should recognize that other application components falling within the scope of the present invention are not limited to on-line poker playing components, and may include other application that may interact with the messaging component 110, including, but not limited to, music engines whereby the messaging component 110 may instruct the TV application component 112 as to the current song to which a user is listening, search applications whereby the messaging component 110 may instruct the TV application component 112 as to the keywords over which a user is searching and the related result set, etc. These are examples of a given user's context that the TV application component 112, in conjunction with the messaging component 110, may propagate to users of the content distribution server 102 to provide for a shared content consumption experience.

As indicated above, the TV application component 112 may propagate a given user's context to other users in the given user's social network, which may include channel information regarding a TV program that the given user is viewing. An issue arises, however, when individual users are accessing TV content in different time zones and locations with different channel assignments. The content distribution server 102 includes an electronic program guide component 118 communicatively coupled to the network 100 and operative to receive electronic program guide information, e.g., the program schedule for a given location and time zone. The electronic program guide component 118 queries program guide servers (not pictured) that are in communication over the network 100, such as the program guide servers operated by Tribune Media Services. The electronic program guide component 118 stores the one or more electronic program guides in an EPG data store 120. According to one embodiment of the invention, the EPG data store 120 is a relational database, but may be substituted by a tab delimited data store, a comma delimited data store, an object oriented database, a hybrid object-relational database, or other data stores known to those of skill in the art. Systems and methods for generating electronic program guides include U.S. Pat. No. 6,813,774, entitled "PROGRAM GUIDE DISPLAY APPARATUS AND PROGRAM GUIDE DISPLAY METHOD", U.S. Pat. No. 6,763,522, entitled "SYSTEM AND METHOD FOR A DIGITAL TELEVISION ELECTRONIC PROGRAM GUIDE" and U.S. Pat. No. 6,611,958, entitled "ELECTRONIC PROGRAM GUIDE FEATURE FOR AV SYSTEM", the disclosures of which are hereby incorporated by reference in their entirety. Furthermore, those of skill in the art recognize a number of electronic program guides are commercially available, including those available from Pioneer, Scientific Atlanta, Motorola, Gemstar/TVGuide ("GTVG"), Charter Communications, etc.

When the TV application component 112 propagates a given user's context to other users in the given user's social network, the TV application component 112 may query the electronic program guide component 118 to determine a local context for a user in the social network that corresponds to the user's context. For example, where the user is viewing a program on the ABC network, that same program is not necessarily being transmitted on the same channel in all locations and time zones, if the program is being transmitted at all. Accordingly, for each user in a given user's social network to which the TV application component 112 is to transmit a given user's context, the electronic program guide component 118 retrieves the electronic program guide from the EPG data store 120 for a user in the social network.

The electronic program guide component 118 executes a search in an attempt to locate the program that the given user is viewing in the electronic program guide. If successful, the electronic program guide component 118 instructs the TV application component 112 as to the channel on which the user in the social network may find the program that the given user is viewing being transmitted; the TV application component 112 may propagate this information as part of the given user's context. Where the electronic program guide component 118 cannot locate the given user's context in the electronic program guide, e.g., the program that the given user is viewing is not presently being transmitted in the time zone in which the user in the social network is located, the electronic program guide component 118 may identify alternate times at which the program is being transmitted, which the TV application component 112 may also propagate as part of the given user's context. The TV application component 112 transmits this information to the user in the social network. Where the client device 126*a*, 128*a*, 130*a* and 132*a* comprises digital video recording functionality ("DVR"), the TV application component 118 may provide the user in the social network with an opportunity to schedule recording of the program. Recording may also comprise the recording of content that is not selectable by a given user through interaction with an EPG, e.g., Internet based content. It should be noted that selection of a program or other content for recording may be recorded in the user's profile as a context or context change.

As an alternative to the foregoing, or in conjunction therewith, the content distribution server 102 may use a unique identifier to identify each program that it is transmitting to clients 126*a*, 128*a*, 130*a* and 132*a*, e.g., stored in the EPG data store 120. The electronic program guide component 118 searches the EPG data store 120 to locate the program that the given user is viewing and determines the program's unique identifier, which the TV application component 112 may propagate as part of the given user's context. A client device 126*a*, 128*a*, 130*a* and 132*a* that a user in the given user's social network is operating receives the given user's context and attempts to identify the program that the given user is viewing in a local electronic program guide, which may be stored on the client 126*a*, 128*a*, 130*a* and 132*a* or retrieved from a network source. If successful, client side software, e.g., a TV client 126*b*, 128*b*, 130*b* and 132*b*, instructs the user in the social network as to the channel on which he or she may find that program that the given user is viewing, which may include allowing the user in the social network to tune to channel on which the TV application component 118 is transmitting the program. Where the identifier for the program cannot be located in the local electronic program guide, client side software may identify alternate times at which the program is being transmitted. Where the client device 126a, 128a, 130a and 132a comprises digital video recording functionality ("DVR"), the client 126a, 128a, 130a and 132a may provide the user in the social network with an opportunity to schedule recording of the program. Recording functionality of the DVR may also include the recording of content that does not appear in an EPG, e.g., Internet based content.

As discussed above, interaction with the messaging component 110 and TV application component 112 may be recorded by the profile component 116, which maintains a profile 108 for each user in a profile data store 106. In other words, the profile 108 contains a history of the user's context changes as a function of time, allowing decisions to be made regarding the given user's preferences on this basis. For example, where the user's context is identified as viewing science fiction programs for long periods of time and news programs for short periods of time, a decision may be made that the user prefers science fiction programs. This may also account for sub-genres, e.g., science fiction/action, science fiction/horror, etc. Each profile 108 may also comprise context information as a function of time for other users in a given user's social network, as well as other users that utilize the content distribution server 102.

A recommendation component 124 may utilize user profiles in the profile data store to supply recommended programming to the user, which may also include providing recommendations for using other applications, such as in response to on-line events, users with whom a given user might want to be a buddy, ancillary TV content, etc. According to embodiments of the invention, the recommendation component 124 may utilize a user profile in determining recommended content to a user. Alternatively, or in conjunction with the foregoing, the recommendation component 124 may also utilize the user profiles of a given user's buddies, e.g., the profiles of those users that are in the given user's social network. The recommendation component 124 may also compute a vector for the given user's profile and include those users with similar profile vectors in its calculation of recommended content. Also, the recommendation component 124 may utilize profiles for user communities, which contain aggregate context information for a community of users, when determining recommended content. Similarly, the recommendation component 124 may utilize a personalization service, such as My Yahoo!, which allows users to create and edit their own profiles for indicating media preferences (e.g., favorite channels or TV programs), which are stored on Yahoo! servers (which may be profile data stores 106) and made available to the recommendation component 124.

The recommendation component 124 allows the content distribution server 102 to harness the viewing experience, habits and preferences of the users who are interacting with the content distribution server 102. As indicated above, the recommendation component 124 may provide recommendations beyond TV content, extending to all services that the content distribution server offers. For example, a user may interact with the messaging component 110 to access other application component 122 through the TV application component 112. One exemplary other application component 122 is an on-line poker game in which users play against each other on line. Where the user profile indicates that the user spends substantial time in the context of an on-line poker application 122, the recommendation component may alert the user when an upcoming on-line poker tournament is approaching.

The system of the present invention illustrated at FIG. 1 provides for a shared content consumption experience for users of the content distribution server 102. A given user may be informed of the context of other users of the system, including users in the given user's social network. According to one embodiment, icons and accompanying textual data are propagated by the TV application component and presented to the given user on a client device 126a, 128a, 130a and 132a, indicating the context of other users of the server 102. The presentation of the context of other users in conjunction with the presentation of TV content allows for a shared viewing experience whereby a given user may know the context of other users and may change his or her context to that of another user. For example, where the context of a user in a given user's social network indicates the user in the social network is watching a program that is enjoyable to the given user, the given user may change his or her context to match that of the user in the social network (e.g., tuning to receive transmission of the same TV content that the user in the social network is consuming). Using the architecture described herein, a number of applications become available in the context of the TV consumption process, including, but not limited to personalization, community viewing, shared presence and context, messaging, access to ratings and recommendations (including community reviews), alerts, etc.

The content service provider 102 provides access to it functions and application components through the use of one or more application program interfaces ("API") 100. An API 100 is an interface, or set of calling conventions, by which a given application component accesses other application components and the services that the application components offer. By using the API 100, a given application component advertises information regarding the functions and/or services that the given application component may provide to other components, which may also include the technique by which the functions or services are accessed. This allows the application components comprising the system to access supporting system and network services. For example, the API 100 allows client side applications to issue function calls for the performance of actions and accessing of services, such as tuning a channel, accessing an on-line game, listening to music, allowing the messenger component to interface with the TV application component or a messaging client to access EPG data, etc., as described herein. Although FIG. 1 illustrates the API 100 as a separate system component, those of skill in the art recognize that each application component may provide an individual API 100 identifying the specific functions and services a given application component provides. Furthermore, application components, e.g., a messaging client 126c, 128c, 130c, 132c, resident on client devices 126a, 128a, 130a, 132a may provide one or more APIs 100 advertising the functions and service the given application component provides.

Figure 2:
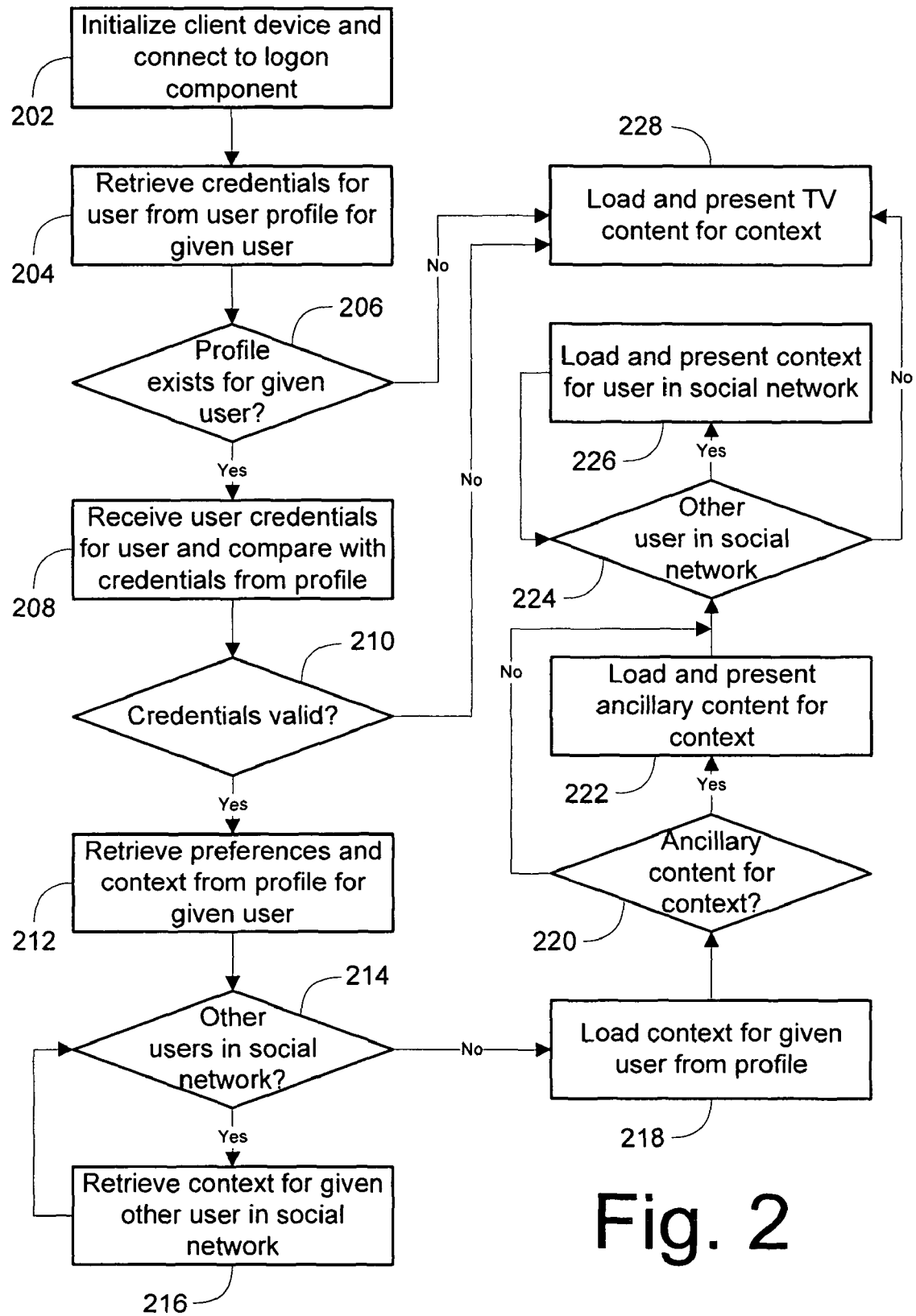
FIG. 2 is a flow diagram presenting a method for initializing a given user's session and propagating the given user's context to one or more other users according to one embodiment of the present invention.

One embodiment of a method for initializing a client device for the receipt of content according to the present invention is illustrated in FIG. 2. According to the method of FIG. 2, a client device initializes and connects to a logon component, step 202. Initialization may comprise a client device powering up and initializing a communications stack, such as a TPC/IP stack, and opening a connection to the logon component over a network, e.g., the Internet. The logon component attempts to retrieve or otherwise receive a user's logon credentials for a given user from the user's profile, step 204. Where no profile exists for the given user, step 206, the user is assigned a default context and presented with TV content for the default context, step 228. Because the user does not have a profile, step 206, they are prevented from accessing the functionality of system beyond consumption of TV content, step 228.

Where a profile exists for a given user, step 206, the system receives the given user's credentials from the user's profile and compares the credentials from the profile with user credentials that system receives from the user, step 210. Upon obtaining credentials from the given user and credentials from the given user's profile, the system performs a check in an attempt to validate the user's credentials, step 210. Where the user fails to supply valid credentials for logon to the system, access is denied and the user is assigned a default context and presented with TV content for the default context, step 228.

Where the user supplies credentials that the system is capable of validating or otherwise authenticating, step 210, the system retrieves preferences and context for the given user from the given user's profile, step 212. According to one embodiment, the system maintains the context and preferences is a transient memory structure until it is utilized. The system also traverses the given user's profile to determine if the given user maintains buddies or other users that are related to the given user in a social network. The system performs a check to determine if users exist in the given user's social network, step 214. Where another user exists in the given user's social network, step 214, the system retrieves the context from the user profile for the another user. The process repeats, steps 214 and 216, until the system retrieves the context for all users in the given user's social network. Where no users exist in the given user's social network, processing proceeds directly to step 218.

The system loads the given user's context from the given user's profile, step 218. The system also performs a check to determine if the context in the given user's profile identifies any ancillary TV content and whether the ancillary TV content is available, step 220. According to one embodiment, a user profile identifies categories of ancillary TV content, e.g., images, audio, video, etc., whereby the system uses selected categories to search for content that is related to the user's context, for example, images for actors in the cast of a movie that the user is viewing. Alternatively, or in conjunction with the foregoing, the user may indicate in his or her profile specific items of ancillary TV content. Where the given user's context identifies ancillary TV content, step 220, the system retrieves and loads the ancillary TV content on the given user's client device, step 222. Ancillary TV content may comprise any content that is related to an item of TV content. For example, where the user context indicates that the user is viewing a given program on a given TV channel, ancillary TV content may comprise textual information regarding the given program, such as actors, directors or other cast members on the given program, video content that is related to the given program or cast members, image files related to the given program or cast members, audio files related to the given program or cast members, as well as combinations thereof. According to one embodiment, the system presents the ancillary TV content in conjunction with the TV content. Alternatively, the system may provide links to the ancillary TV content.

The system performs another check to determine if there are users located within the given user's social network, step 224. For a selected user in the given user's social network, the system loads and presents the context for the user in the social network on the client device with which the user is accessing the system, step 226. The process repeats, steps 224 and 226, for users in the given user's social network. When the system completes loading and presenting to the given user the context for users in the given user's social network, step 226, the system loads and presents TV content according to the context that the given user's profile identifies, step 228. It should be noted however, that a user's context may indicate an activity other than the consumption of TV content. In this case, the system may present information that is appropriate for the user's context.

Figure 3:
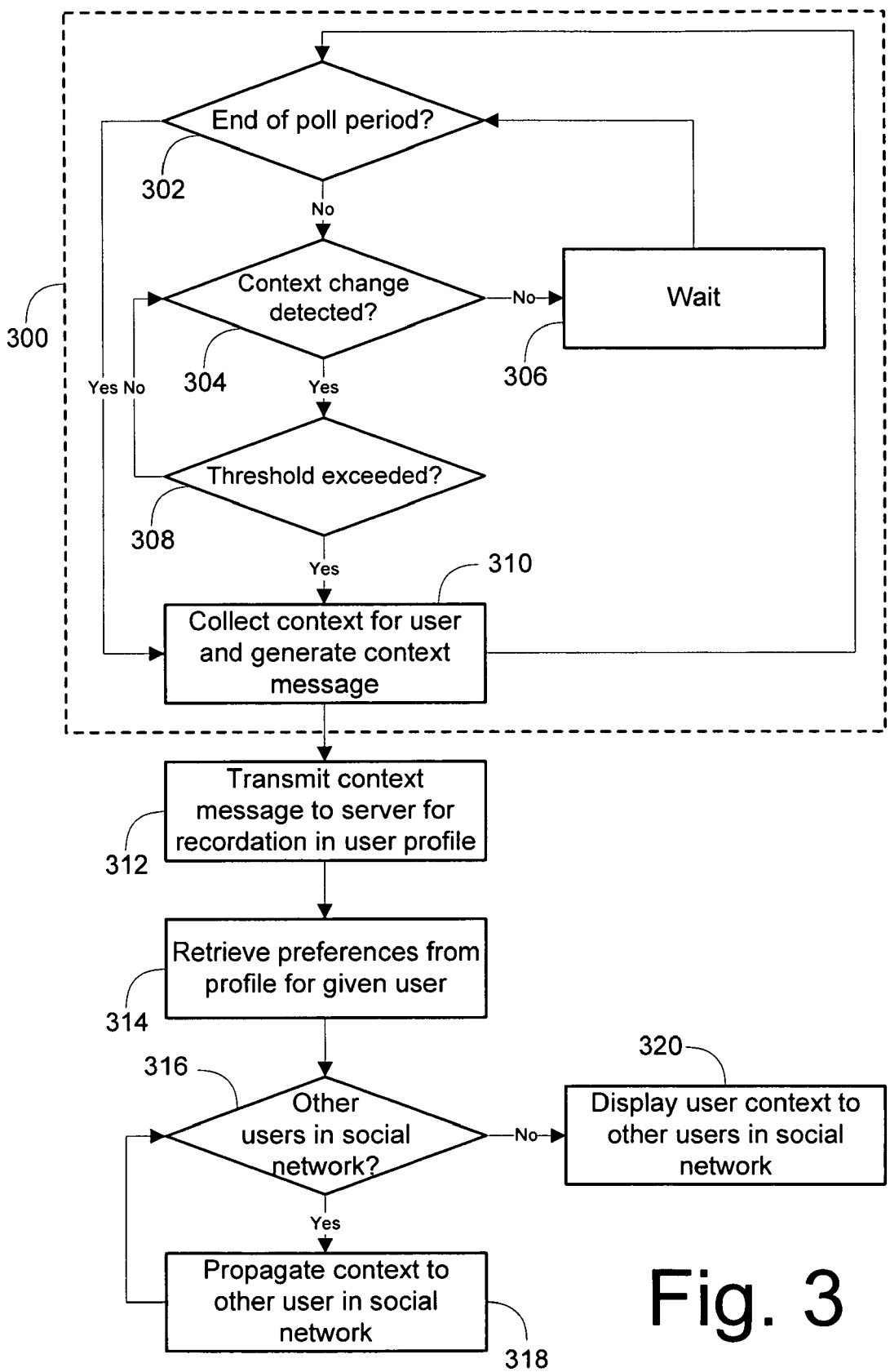
FIG. 3 is a flow diagram presenting a method for propagating changes in a given user's context to one or more other users according to one embodiment of the present invention.

After the given user initializes his or her client device, the system may update and propagate his or her context to other users of the system or other users in his or her social network. FIG. 3 presents one embodiment of a method for propagating a given user's context to other users of the system. According to the process illustrated by FIG. 3, a subroutine 300 is executed as a loop and may be viewed as beginning with the execution of a check to determine if the poll period has ended, step 302. According to one embodiment of the present method, the polling period is an interval of thirty seconds, although those of skill in the art should recognize that other polling periods may be selected depending on the frequency with which the system is to transmit context updates to other users of the system, e.g., modifying the polling frequency in response to channel surfing by the user. Where the polling period has expired, step 302, the system collects the context for the given user and generates a context message that comprises information regarding the given user's context, step 310.

Where the polling period has not expired, step 302, a check is performed to determine if the given user has performed an action resulting in a context change, step 304. If the polling period has not expired, step 302, and the system does not receive an indication that there has been a change in context for the given user, step 304, the system enters a wait state, step 306, upon expiration of which processing returns to step 302 were a subsequent check is performed to determine if the polling period has expired. Where the system detects a change in context for a given user, step 304, the system performs a check to determine if a time threshold has been exceed. Upon expiration of the time threshold, the system collects the context for the given user and generates a context message comprising information regarding the given user's context, step 310. The use of a threshold prevents the system from propagating every context change to other users of the system, which may be undesirable when the user is, for example, channel surfing. According to one embodiment, the time threshold is reset in response to each context change such that only the final context upon which the user settles for a period of time that exceeds the threshold is propagated to other users of the system.

According to one embodiment, the subroutine 300 is executed at the client device and content messages are sent to the server for propagation to other users of the system. Alternatively, the system is operative to observe the user's context, generate a context message according to the subroutine 300 and transmit the context message for propagation to other users of the system.

Regardless of the where the subroutine 300 is executed, the context message is transmitted for recordation in the user profile for the given user, step 312, e.g., using a profile component to identify and write the new context information to the user profile for the given user. The system retrieves the user profile for the given user to identify one or more other users that are part of the given user's social network, step 316. The system selects a user from the set of users in the given user's social network and propagates the given user's context to the selected user, step 318. The system continues to check for additional users in the given user's social network, step 316, and propagates the given user's context to users in the given user's social network, step 318, until the check performed at step 316 evaluates to false. The system then displays the context for the given user that has been propagated to users in the given user's social network, step 320. Furthermore, the system may propagate the context for the given user to other users of the system who are not in the given user's social network, e.g., users of the system whose preferences and content consumption habits are similar to those of the given user.

Figure 4:
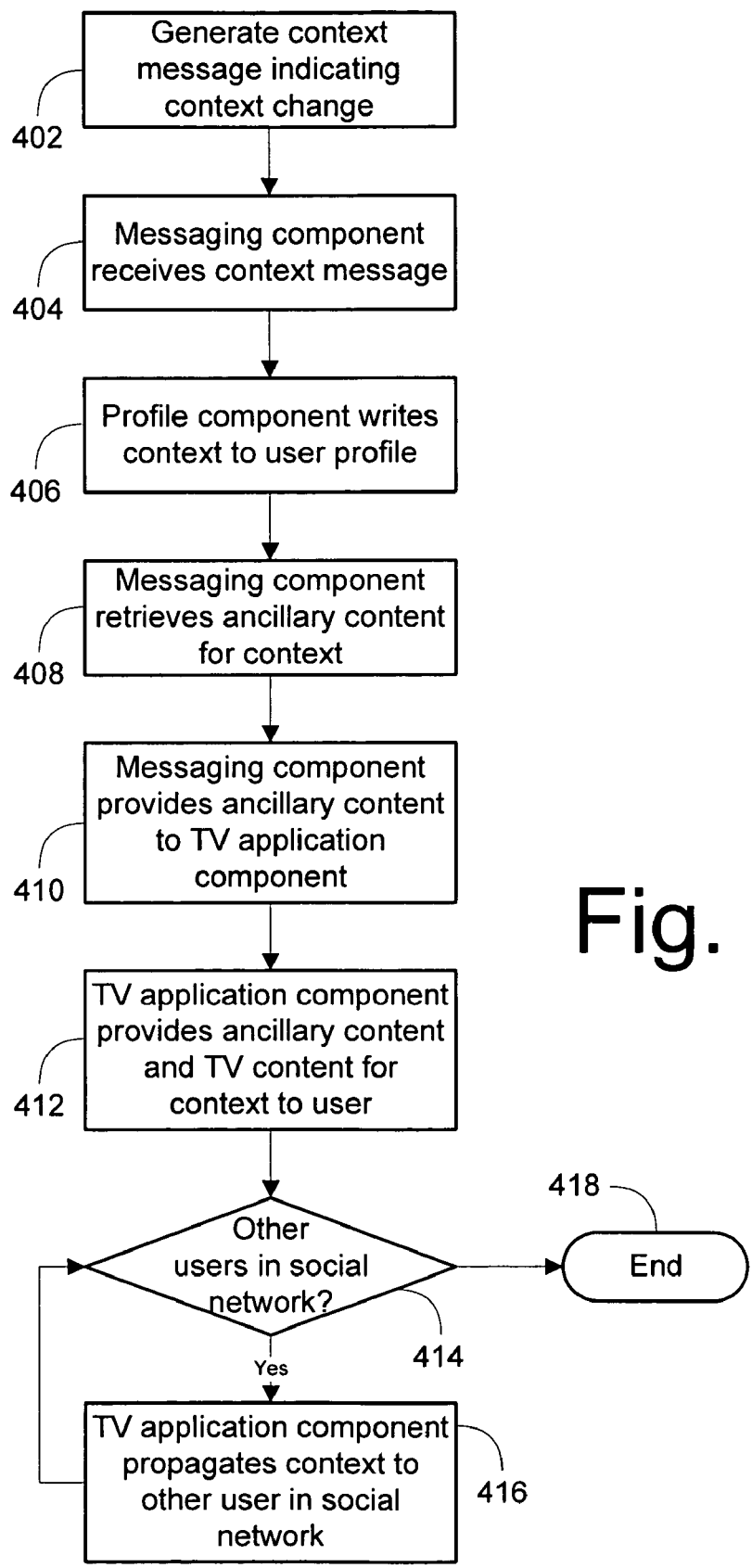
FIG. 4 is a flow diagram presenting a method for propagating changes in a given user's context to one or more other users according to another embodiment of the present invention.

FIG. 4 illustrates an alternative embodiment of a process for propagating changes to a given user's context to other users in the given user's social network. According to the embodiment illustrated by FIG. 4, the system generates a context message in response to the user taking an action that results in a change of context, step 404. It should be noted, however, that the user's context may change without any proactive action on the part of the user, for example, where the user is watching a program on a given channel and the program ends, the subsequent initiation of a new program on the same channel results in a context change and the generation of a context message indicating the context change, step 404.

The messaging component receives the context change message, step 404. Alternatively, the messaging component generates the context message indicating the context change by observing the given user's interaction with a client device. A profile component receives the messaging indicating the context change and writes the context change to the user profile for the given user, step 406. Analyzing the user profile, the messaging component identifies and retrieves any ancillary TV content, step 408, which the messaging component provides to the TV application component, step 410. The TV application component provides the TV content for the user context and any accompanying ancillary TV content to the user for rendering and display on a client device, step 412.

The TV application component propagates the context for a given user to other users of the system. The system performs a check to determine if the given user has other users in the given user's social network, step 414. A user is selected from the users in the given user's social network and the TV application server propagates the given user's context to the user in the social network, step 416. It should be noted that propagation of the given user's context is not limited to users in the given user's social network and may be propagated to other users of the system that are not necessarily in the given user's social network. The process repeats for each user in the given user's social network, step 416. When TV application component has propagated the given user's context to users in the given user's social network the process ends, step 418. The process of FIG. 4 may repeat from step 402 in response to subsequent changes in the given user's context.

In order for the system of the present invention to accurately provide a given user's context to other users of the system, e.g., users in the given user's social network, the system is provided with knowledge regarding the scheduling and transmission of TV content by a plurality of TV content distribution systems. As discussed above, the TV application component may transmit TV content from a plurality of TV content distribution systems according to the schedule of a given TV content distribution system. For example, where the user is viewing TV content in San Francisco, the TV application component transmits TV content to the user according to the schedule of the San Francisco TV content distribution system. The system therefore has access to scheduling information from a plurality of TV content distribution systems.

Figure 5:
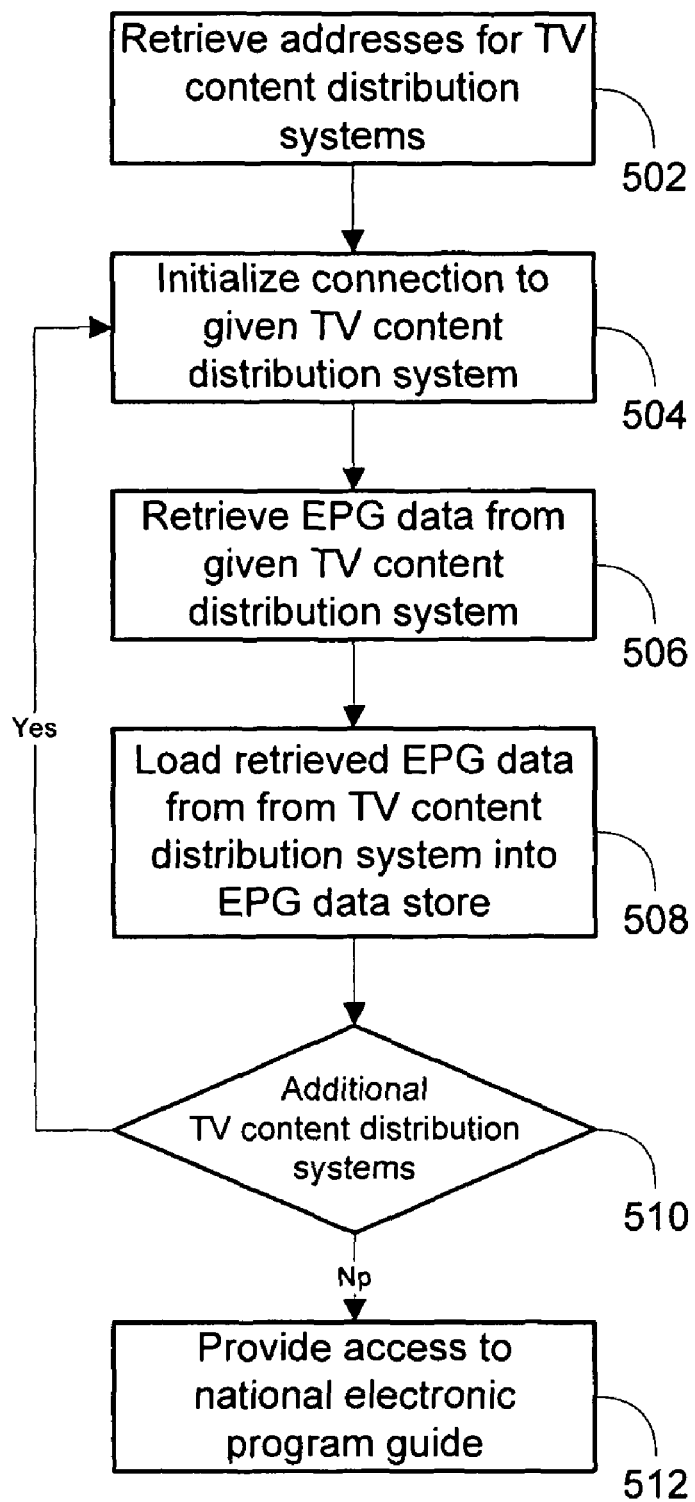
FIG. 5 is a flow diagram presenting a method for generating a national electronic program guide from electronic program guides retrieved from one or more TV broadcast systems according to one embodiment of the present invention.

FIG. 5 illustrates one embodiment of a method for generating a national electronic program guide from electronic program guides retrieved from one or more TV broadcast systems. According to the method of FIG. 5, the process begins with retrieval of addressing information for a plurality of TV content distribution systems, step 502, e.g., the address of the TV content distribution systems located in various regions of the United States. The system selects an address from the plurality of addresses of TV content distribution systems and initializes a connection to the TV content distribution system identified by the address, step 504. According to one embodiment, the electronic program guide component initializes the connection and executes the process of FIG. 5.

The system retrieves electronic program guide data from the TV content distribution system, the electronic program guide data identifying the schedule of transmission and respective channels for programming from the TV content distribution system, step 506. The system loads the retrieved electronic program guide data into an electronic program guide data store, step 508. According to one embodiment, the electronic program guide data store is a relational database whereby electronic program guide data is written into related tables in the database, although one may substitute other data structures known to those of skill in the art. A table may comprise electronic program guide data from a given TV content distribution system in conjunction with data identifying the given TV content distribution system to thereby allow the system to locate a program being transmitted on a given channel at a given time to user's services by the given TV content distribution system. For example, where a first user is watching "The Apprentice" on channel three at eight P.M. in a first location, the system may examine the electronic program guide for a second user at a second location to determine that the program is being transmitted to the user at nine P.M. When providing the second user with the context of the first user, the system may indicate to the second user the time when the program is available to the second user.

The system performs a check to determine if additional electronic program guide data is to be retrieved from additional TV content distribution systems, step 510. Where additional TV content distribution systems exist, the system initializes a connection to a subsequent TV content distribution system, step 504, and retrieves and loads electronic program guide data from the subsequent TV content distribution system, steps 506 and 508. If no additional TV content distribution systems exist, step 510, the system provides access to the national electronic program guide created from electronic program guide data from the plurality of TV content distribution systems. Alternatively, the system may make available electronic program guide data as the system receives the data from the plurality of TV content distribution systems.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

We claim:

1. A computerized method for providing an indication of an action of a given user consuming content on a client device transmitted from a content distribution system, the method comprising:

electronically generating an indication of a change in context for a given user of a client device, the context comprising information regarding an action of the given user with a given one of a plurality of disparate services provided by the content distribution system, the plurality of disparate services including a television service, an online gaming service, and a music service;

identifying a television content associated with the change in context for the given user;

determining, via an electronic program guide component, one or more alternate times at which the television content associated with the change in context for the given user is available to one or more users in a social network of the given user, wherein the one or more users in the social network of the given user are identified from one or more instant messaging clients;

electronically propagating the indication of the change in context for the given user to one or more users in the social network of the given user with contexts in any given one of the plurality of disparate services, the propagated indication of the change in context including the identification of the television content associated with the change in context for the given user and the one or more alternate times at which the television content is available to the one or more users in the social network of the given user;

electronically presenting the indication of the change in context for the given user to users in the given user's social network in conjunction with content from the any given one of the plurality of disparate services; and providing the users in the given user's social network within the contexts of the any given one of the plurality of disparate services, an opportunity to schedule recording of the television content associated with the change in context for the given user at the one or more alternate times.

2. The method of claim 1 wherein propagating comprises propagating the indication to other users in the given user's social network with a direct relationship with the given user.

3. The method of claim 1 comprising identifying one or more other users in the social network of the given user, the one or more other users consuming TV content on client devices in communication with one or more TV content distribution systems.

4. The method of claim 1 wherein presenting the indication of the change in context comprises presenting an icon representing the changed context.

5. The method of claim 4 wherein presenting comprises presenting an icon representing a television program.

6. The method of claim 4 wherein presenting comprises presenting an icon representing a movie.

7. The method of claim 4 wherein presenting comprises presenting an icon representing an on-line game.

8. The method of claim 4 wherein presenting comprises presenting an icon representing audio content.

9. The method of claim 1 wherein generating an indication comprises generating in response to a change in channel.

10. The method of claim 1 wherein generating an indication comprises generating in response to joining an on-line game.

11. The method of claim 1 wherein generating an indication comprises generating in response to viewing a movie.

12. The method of claim 1 wherein generating an indication comprises generating in response to listening to music.

13. The method of claim 1 wherein propagating comprises propagating to users on a given user's buddy list maintained by an instant messenger client on the given user's client device.

14. A computerized method for providing an indication of an action of a given user consuming content on a client device transmitted from a content distribution system, the method comprising:

electronically receiving an indication of a change in context for a given user of a client device, the context comprising information regarding an action of the given user with a given one of a plurality of disparate services provided by the content distribution system, the plurality of disparate services including a television service, an online gaming service, and a music service;

identifying a television content associated with the change in context for the given user;

determining, via an electronic program guide, one or more alternate times at which the television content associated with the change in context for the given user is available to one or more users in a social network of the given user, wherein the one or more users in the social network of the given user are identified from one or more instant messaging clients;

electronically propagating the indication of the change in context for the given user to one or more users in the social network of the given user with contexts in any given one of the plurality of disparate services, the propagated indication of the change in context integrated into content of the contexts from the any given one of the plurality of disparate services and including the identification of the television content associated with the change in context for the given user and the one or more alternate times at which the television content is available to the one or more users in the social network of the given user; and providing the users in the given user's social network within the contexts of the any given one of the plurality of disparate services, an opportunity to schedule recording of the television content associated with the change in context for the given user at the one or more alternate times.

15. The method of claim 14 wherein propagating comprises propagating to users on a given user's buddy list maintained by an instant messenger client on the given user's client device.

16. The method of claim 14 wherein propagating the indication of the change in context comprises propagating an icon representing the changed context.

17. The method of claim 14 wherein propagating comprises propagating an icon representing a television program.

18. The method of claim 14 wherein propagating comprises propagating an icon representing a movie.

19. The method of claim 14 wherein propagating comprises propagating an icon representing an on-line game.

20. The method of claim 14 wherein receiving an indication comprises receiving in response to a change in channel.

21. The method of claim 14 wherein receiving an indication comprises receiving in response to joining an on-line game.

22. The method of claim 14 wherein receiving an indication comprises receiving in response to listening to audio content.

23. The method of claim 14 wherein propagating comprises propagating the indication to other users in the given user's social network with a direct relationship with the given user.

24. A computerized method for providing an indication of an action of a given user consuming content on a client device transmitted from a content distribution system, the method comprising:

electronically receiving an indication of a change in context for a given user of a client device, the context comprising information regarding an action of the given user with a given one of a plurality of disparate services provided by the content distribution system, the plurality of disparate services including a television service, an online gaming service, and a music service;

electronically receiving, via an electronic program guide component, an indication of a change in context from one or more users in the given user's social network, wherein the one or more users in the social network of the given user is identified from one or more instant messaging clients;

identifying a television content associated with each of the received indications of a change in context for the given user and the one or more users in the given user's social network;

determining one or more alternate times at which each of the television content associated with the change in context for the given user is available to the given user and the one or more users in the social network of the given user;

propagating, to the given user and the users in the given user's social network with contexts in any given one of the plurality of disparate services, each other's indication of a change in context, the propagated indications of a change in context integrated into content of the contexts from the any given one of the plurality of disparate services and including the identification of the television content associated with each of the received indications of a change in context for the given user and the one or more users in the given user's social network and the one or more alternate times at which each of the television content is available to the given user and the one or more users in the social network of the given user; and providing the given user and the users in the given user's social network within the contexts of the any given one of the plurality of disparate services, an opportunity to schedule recording of each other's television content associated with the indications of a change in context for the given user and the one or more users in the given user's social network at the one or more alternate times.

25. The method of claim 24 wherein receiving comprises receiving the indication from other users in the given users' social network with a direct relationship with the given user.

26. The method of claim 24 comprising identifying one or more other users in the social network of the given user, the one or more other users consuming TV content on client devices in communication with one or more TV content distribution systems.

27. The method of claim 24 wherein receiving the indication of the change in context comprises receiving an icon representing the changed context.

28. The method of claim 24 wherein receiving comprises receiving an icon representing a television program.

29. The method of claim 24 wherein receiving comprises receiving an icon representing a movie.

30. The method of claim 24 wherein receiving comprises receiving an icon representing an on-line game.

31. The method of claim 24 wherein generating an indication comprises generating in response to joining an on-line game.

32. The method of claim 24 wherein generating an indication comprises generating in response to viewing a movie.

33. The method of claim 24 wherein generating an indication comprises generating in response to listening to audio content.

34. The method of claim 24 wherein receiving comprises receiving from users on a given user's buddy list maintained by an instant messenger client on the given user's client device.

35. A system for providing an indication of an action of a given user consuming content on a client device transmitted from a content distribution system, the system comprising:

a TV application component operative to:
receive a command indicating a context change from a given user of a client device and to transmit content that is responsive to the changed context to a client device of the given user, wherein the changed context comprises information regarding an action of the given user with a given one of a plurality of disparate services provided by the content distribution system, the plurality of disparate services including television service, an online gaming service, and a music service, and identify a television content associated with the changed context for the given user;

an electronic program guide component operative to determine one or more alternate times at which the television content associated with the change in context for the given user is available to one or more users in a social network of the given user, wherein the one or more users in the social network of the given user are identified from one or more instant messaging clients; and a messenger component operative to receive the changed context for the given user from the TV application component, identify one or more users in the given user's social network and propagate an indication of the changed context to the one or more users in the given user's social network with contexts in any given one of the plurality of disparate services, the indication of the changed context integrated into content of the contexts from the any given one of the plurality of disparate services and including the identification of the television content associated with the changed context for the given user and the one or more alternate times at which the television content is available to the one or more users in the social network of the given user, and provide the users in the given user's social network within the contexts of the any given one of the plurality of disparate services, an opportunity to schedule recording of the television content associated with the changed context for the given user at the one or more alternate times.

36. The system of claim 35 wherein the client device comprises a set top box.

37. The system of claim 35 wherein the client device comprises a mobile device.

38. The system of claim 37 wherein the mobile device comprises a cellular handset.

39. The system of claim 37 wherein the mobile device comprises a personal digital assistant.

40. The system of claim 35 wherein the client device comprises a personal computer.

41. The system of claim 35 wherein the client device comprises networked consumer electronic devices.

42. The system of claim 35 wherein the messaging component is in communication with one or more messaging clients to which the messaging component propagates an indication of the changed context.

43. The system of claim 35 comprising a profile component operative to receive the changed context from the messaging component and record the context change for the given user in a user profile.

44. The system of claim 43 comprising a profile data store operative to maintain one or more user profiles.

45. The system of claim 43 wherein the profile component records a plurality of context changes for a given user to a user profile for the given user.

46. The system of claim 43 comprising a recommendation component operative to read the context change from the user profile for the given user and generate a recommendation on the basis of the context change.

47. The system of claim 46 wherein the recommendation component recommends a movie.

48. The system of claim 46 wherein the recommendation component recommends a television program.

49. The system of claim 46 wherein the recommendation component is operative to read context changes from a plurality of user profiles and generate a recommendation on the basis of the plurality of context changes.

50. The system of claim 49 wherein the plurality of user profiles is a community of users.

51. The system of claim 49 wherein the plurality of user profiles are a related social network of user profiles.

52. The system of claim 35 comprising one or more other applications operative to interface with the TV application component for transmission of content from a given one of the one or more other applications.

53. The system of claim 52 wherein other applications comprise one or more on-line game applications.

54. The system of claim 52 wherein other applications comprise one or more audio playback applications.

* * * * *